April 30, 1968   M. L. BAKER   3,380,439
WASTE HEAT RECOVERY SYSTEM
Filed July 25, 1966   2 Sheets-Sheet 1
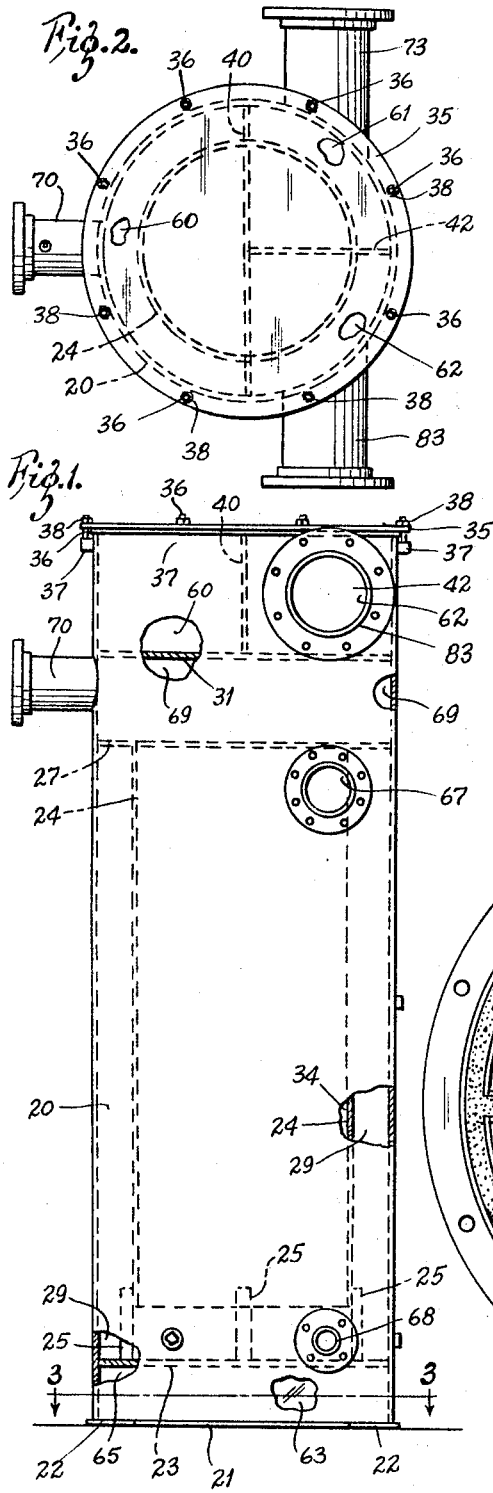
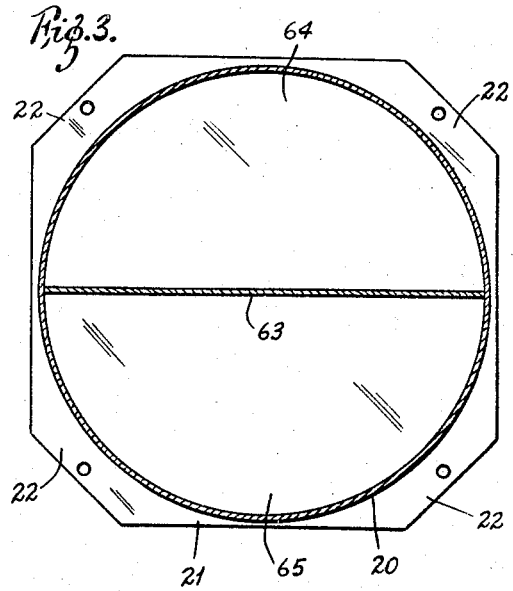
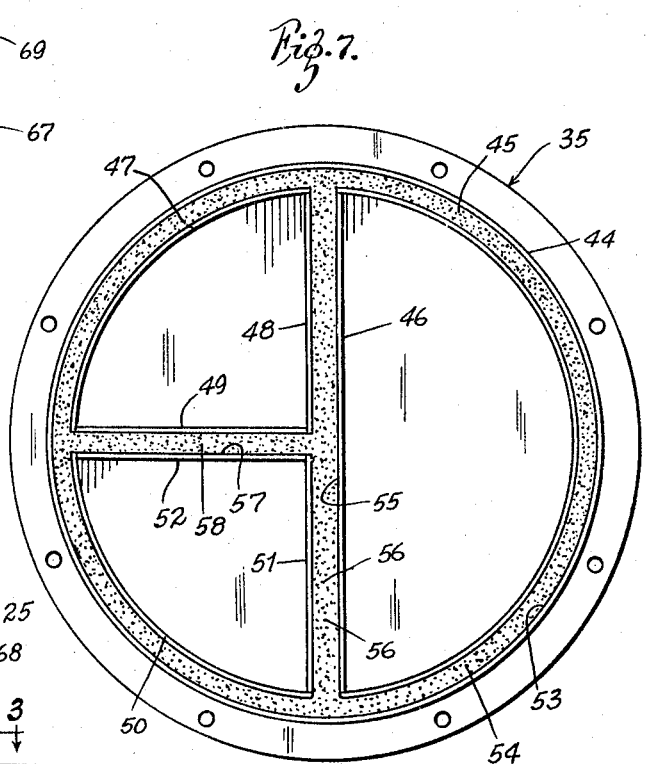
INVENTOR:
MARION L. BAKER,
BY Kingsland, Rogers, Ezell, Eilers & Robbins
ATTORNEYS April 30, 1968 — M. L. BAKER — 3,380,439
WASTE HEAT RECOVERY SYSTEM
Filed July 25, 1966 — 2 Sheets-Sheet 2
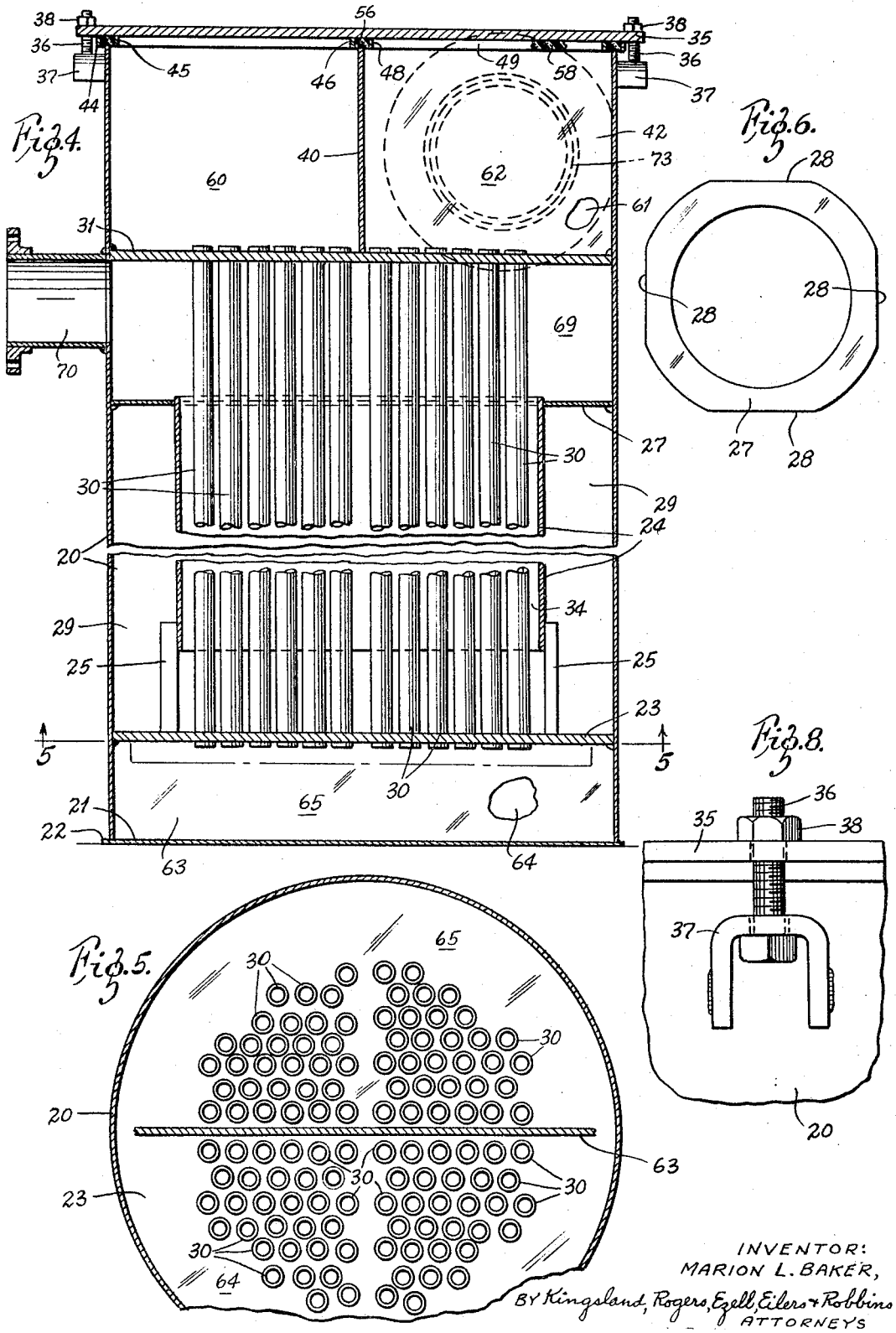
INVENTOR:
MARION L. BAKER,
BY Kingsland, Rogers, Ezell, Eilers & Robbins
ATTORNEYS United States Patent Office 3,380,439
Patented Apr. 30, 1968

3,380,439
WASTE HEAT RECOVERY SYSTEM
Marion L. Baker, Glendale, Mo., assignor to St. Louis Shipbuilding-Federal Barge, Inc., St. Louis, Mo., a corporation of Missouri
Filed July 25, 1966, Ser. No. 567,537
10 Claims. (Cl. 122—7)

ABSTRACT OF THE DISCLOSURE

The apparatus, especially adapted for using waste heat from the cooling system and from the exhaust of an internal combustion engine, combines a vapor separator space into which the cooling liquid is introduced in a swirling manner, with a vaporizer space having an exhaust heat exchanger. The separator space and vaporizer space are one within the other and connected together top and bottom. The swirling liquid in the separator space raises the hydraulic head in the separator space, which raises the liquid level in the vaporizer space, owing to means at the bottom of the apparatus to restrain the swirling of the liquid in the vaporizer space.

---

The present invention relates to a waste heat recovery system, particularly of the type usable with internal combustion engines which have waste heat delivered to a cylinder jacket coolant liquid and which have waste heat in their exhaust gases.

In Patent 3,279,438, issued Oct. 18, 1966, on application Ser. No. 436,148, filed Mar. 1, 1965, by the undersigned, a system is disclosed consisting of a steam separator and a boiler or vaporizer that are connected so that they can have a common liquid level and can be contained within the same insulating container.

The present invention is operationally similar to that former one but differs in that it combines the steam separator and the vaporizer, one within the other, so that instead of having two separate units enclosed in one container, there is only a single unit having one shell containing both the steam separator and the vaporizer.

Since the steam separator preferably is one wherein the liquid phase is swirled to obtain an enlarged upper surface and a greater hydrostatic head, and since the vaporizer consists of a dual pass heat exchanger, wherein one fluid passes through a series of conduits that are surrounded by the other fluid, a problem arises as to the ability to swirl the liquid phase of the steam separator without having it interfered with by the tubes and other components of the vaporizer.

In the preferred embodiment of this invention, which is here illustrated, the problem has been overcome by putting the vaporizer inside of, and concentric with, the steam separator. The separator thereby can have its direct connections brought in for introducing the liquid tangentially and taking it out for return to the engine without interfering with the piping of the vaporizer. At the same time, the vaporizer can occupy only the central part of the shell in which the steam separation takes place so that the two can communicate freely in the steam and water levels. It is to be understood that there are other embodiments that can be made, wherein the steam separator and vaporizer are combined into one, with common water and steam spaces, but the present one has advantages as appear from this description.

Objects of the invention are to provide a very compact waste heat recovery system and apparatus that accomplishes the foregoing features. Other objects include the combining of a separator and a vaporizer in a way to minimize heat loss and improve thermal efficiency, to improve the heat-exchange efficiency of the boiler by a novel hot gas flow path, and to improve the structure from the standpoint of building and servicing it. Other advantages will appear from the description to follow.

In the drawings:
FIGURE 1 is an elevation of the apparatus;
FIGURE 2 is a top view;
FIGURE 3 is an enlarged section on the line 3—3 at the bottom of FIGURE 1;
FIGURE 4 is an enlarged diametrical vertical section through the apparatus;
FIGURE 5 is a section on the line 5—5 of FIGURE 4, showing the lower partition or tube sheet;
FIGURE 6 is a view, on a reduced scale, of the top ring of the vapor separator space;
FIGURE 7 is a view of the underside of the cover; and
FIGURE 8 is an enlarged elevation of a portion of the apparatus to show a cover-attaching bolt.

The invention includes an outer cylindrical shell 20 that rises up from a base plate 21. The base 21 may have projecting flanges 22 that can receive bolts for fastening the apparatus to a support. As will appear, all of the major parts of the present apparatus are made of metal, usually steel, for obvious reasons.

There is a horizontal lower partition 23 spaced above the base 21 and welded to the cylindrical shell 20 to seal off the space below it from the space above it. The partition 23 provides a bottom wall for a vapor separation space and for one pass of a heat-exchanger or vaporizer, as will appear. It constitutes a floor for the support of an inner cylindrical shell 24 that is spaced above the partition 23 by a plurality of legs 25. The shell 24 in turn is fitted through and stabilized by a ring 27, that has a maximum outer diameter equal to the inner diameter of the shell 20 but has a plurality of flat edges 28 to permit the flow of fluid upwardly or downwardly past it. The space between the shells 20 and 24, above the partition 23 and below the ring 27, constitutes a vapor-separation space or chamber 29.

The lower partition 23 constitutes a bottom tube sheet for a plurality of tubes 30 that are in sealing relationship with the sheet 23 and open into the space below it. The tubes 30 extend upwardly above the ring 27 and the top of the inner shell 24, and are sealed through an upper partition 31 that constitutes a top tube sheet. These tubes are arranged vertically in the preferred construction, since this gives maximum freedom to the water movements. At the loss of this advantage, they could be arranged otherwise. The upper partition 31 is welded into the upper part of the shell 20 so as to seal the space above it from the space below it. The space within and immediately below the shell 24 outside the tubes 30 constitutes one pass 34 of a heat-exchanger that is a vaporizer or boiler. The interior of the tubes 30 constitutes the other passage of this exchanger.

The top of the shell 20 is closed by a cover 35. The cover is held in place by a number of bolts 36. These bolts are passed through inverted U-shaped lugs 37 and through the overhanging edge of the cover 35, being secured by nuts 38, in the manner illustrated. The space between the partition 31 and the cover 35, into which the tubes 30 open, is divided into several sections. There is one diametrical partition 40 extending all the way across the space and secured in position with respect to the shell 20 and the partition plate 31. Additionally, there is one radial partition 42 at right angles to the partition 40 dividing one of the semi-cylindrical spaces into two quadrants. If the radial partition is omitted, a two-pass exchanger is made, in place of the four-pass exchanger, as will appear.

The cover has rods welded to it that provide channels for receiving and confining packing. As shown in FIGURE 7, the cover 35 has one rod 44 welded on its underside in the form of a complete circle. Spaced inwardly therefrom, there is a rod 45, the ends of which are joined by a substantially diametrical rod 46. There is a quadrant rod 47 also spaced inwardly from the rod 44 with two substantially radial rods 48 and 49. Additionally, there is another quadrant rod 50 with two substantially radial rods 51 and 52.

The foregoing rods provide a channel 53 extending all the way around the underside of the cover to receive and hold packing 54, that thereby can be clamped by the bolts 36 against the upper edge of the shell 20. The bars 46, 48 and 51 provide a diametrical channel 55 that receives packing 56 to engage the upper edge of the partition 40. The bars 49 and 52 provide a channel 57 that holds packing 58 that engages the upper edge of the partition 42. In this way the cover 35 is held in sealing relationship to the outer shell and the partitions. The space above the upper partition sheet 31 is thus divided into a semi-cylindrical space 60 and two quadrant spaces 61 and 62.

The space between the bottom 21 and the partition 23 is divided in two by a partition 63 that is at right angles to the diametrical partition 40 in the upper section. This partition 63 divides the lower space into two semi-cylindrical spaces 64 and 65.

Cooling water from an internal combustion engine or the like is brought to a water inlet 67 that opens into the space 29 between the outer shell 20 and the inner shell 24 below the ring 27. This steam separating space 29 communicates into the inner shell at its bottom. At the bottom of the steam separator space 29 there is a water return 68 for conducting water back to the engine. Above the ring 27 steam can occupy the space 69 between the ring 27 and the partition 31. This space constitutes a steam collecting space or plenum chamber, since the inner shell 24 also opens into it at its top. There is a steam outlet 70 by which the steam generated in this apparatus may be conducted to a place of use such as to a turbine. Usually the condensate from the place of use is returned to the system where it can be joined with the water either in the space 29 or in the cooling system.

The inner pass of this heat exchanger, inside the tubes 30, includes also the hot fluid spaces 60, 61 and 62 above the upper partition 31, and the two spaces 64 and 65 below the lower partition 23. There is a hot fluid inlet 73 that opens into the quadrant space 61 that is back of the radial partition 42 in FIGURE 4. Fluid in this chamber 42 travels downwardly through that group of the tubes 30 opening into this quadrant, to the space 64 where it will be behind the partition 65 as it appears in FIGURE 4. The fluid moves laterally to the other side of the center line appearing in the same figure, and thence upwardly through tubes 30 to the semi-cylindrical space 60. It then moves forwardly in the view in the same space 60, and downwardly through tubes 30 to the space 65 on the front side of the partition 60. Thence it moves across this space and up tubes 30 to the forward quadrant space 62 at the top, as illustrated in FIGURE 4, and finally out an exhaust nozzle 83 at the top, concentric with the other exhaust nozzle 73. This direction of travel of the exhaust gases is reversible, and any pressure difference between the nozzles 73 and 83 will cause a flow of the gases along the path indicated.

Appropriate inspection openings, blow-down plugs and the like are provided along with the necessary gauges and valves. These are shown in principle in the former application and need not be repeated here.

OPERATION

Assuming that this apparatus is used with an internal combustion engine, the exhaust from the engine may be connected to the exhaust inlet 73. The exhaust outlet 83 can be connected either to the atmosphere, or to other apparatus. The water inlet 67 is connected from the engine jacket, while the water return 68 is connected back to the engine.

When the engine is operating, the water pump delivers water to the water inlet 67 where it can establish a static water level in the steam separator space 29 and also in the first pass or space 34 within the inner shell 24. The exhaust gases flow in the previously-described path from the inlet 73 through the space 61, tubes 30, space 64, tubes 30, space 60, tubes 30, the space 65, tubes 30, to the space 62 and thence out the exhaust outlet 83. In this way, they deliver heat through the walls of the tubes to the water and to the steam in the other pass 34.

Actually, since the water and vapor mixture from the engine cooling system comes in with some velocity and is discharged more or less tangentially with respect to the space 29 at its upper end, the water is caused to swirl in the separator space. Under the effects of the tangentially introduced influent entering by the inlet 67 and the consequent centrifugal action, the swirling water within the separator space 29 assumes the general form of a portion of a paraboloid of revolution.

Depending upon the amount of heat being developed in the engine and rejected to its water jacket, and the resulting velocity of the swirling liquid within the separator space 29, the upper surface of such liquid assumes various paraboloidal positions which result in various maximum heights of the liquid adjacent to the inner wall of the shell 20. The theoretical inverted apex would be at the axis of the shell. However, in the present arrangement, the paraboloid is incomplete because of the interference of the inner shell 24, and the mass of tubes 30 substantially filling that shell and extending downwardly through the space below the shell. There is, therefore, a comparatively quiescent body of water within and below the inner shell 24, swirling being restrained by the spacers 25 and the tubes 30. The head pressure acting upon the body of quiescent water is a function of the maximum height of the paraboloid of swirling water adjacent the inner surface of the shell 20. This arrangement of the swirling water improves the separation of vapor from liquid, increasing the top surface of the liquid, and it also increases the head of the liquid in the separator 29. The liquid within the inner shell 24 will tend to seek a level higher than the static level of liquid because of the rising of the paraboloidal surface of liquid in the space 29, thereby having a greater area of contact with the outsides of the pipes 30.

The vapor present in the water coming from the cooling system rises off the paraboloidal surface in the space 29 and passes the flat edges 28 of the ring 27 into the steam collecting space 69 from which it can emit through the pipe 70 and be conducted to the point of work.

Meanwhile the hot exhaust gases traversing the path previously indicated through the tubes cause the water within the inner shell 24 to boil and generate more steam which also rises into the space 69 and joins with the other steam passing out the work outlet 70.

The present arrangement not only is compact but also has desirable heat loss qualities. Any heat loss from the high temperature vaporizer portion merely flows into the outer shell where it is largely dissipated by increasing the temperature of the water therein. It can thus generate more steam. Normally, this eliminates the need for further insulation. But in any case the present compact arrangement obviously does not need insulation around the inner shell, thus saving the cost of manufacture over the former arrangement.

The long path of the exhaust gases through the tubes 30 improves the efficiency of this arrangement as a noise depressor or muffler for the engine. This effect is also im- the outside of the combined steam separator and vaporizer.

Various changes and modifications may be made within the process of this invention as will be readily apparent to those skilled in the art. Such changes and modifications are within the scope and teaching of this invention as defined by the claims appended hereto.

What is claimed is:

1. In an apparatus for use with a source of liquid and its vapor and a source of hot fluid: a first and a second shell, one shell being within but spaced from the other, the first shell having a rounded separator space within it, a bottom wall means within the outer shell and below the inner shell and providing a bottom for the separator space; a liquid inlet, directing fluid into the separator space in such a way as to cause the liquid to swirl around the interior of the separator space, a liquid outlet from and adjacent to the bottom of the separator space; an enclosure providing a vapor space above the separator space, connected with the separator space to receive vapor therefrom, a vapor outlet from the vapor space; a vaporizer section within the second shell, providing a heat-exchanger, one pass of which includes the interior of the second shell, the said pass communicating with the separator space near its bottom, and opening into the vapor space at its top; a second pass of the heat-exchanger including fluid conduit means connected through the second shell, out of fluid communication with the first pass but in the heat-exchange relation thereto; and means for connecting the ends of the fluid conduit means into a hot fluid stream; and means to suppress the swirling of liquid at the bottom of the second shell whereby to enable the head of swirling liquid in the first shell to raise the level of static liquid in the second shell.

2. In the apparatus of claim 1: the second pass including also an enclosure above the vapor space enclosure and another enclosure below the separator space, the fluid conduit means opening into said enclosure.

3. In the apparatus of claim 2: the outer shell extending beyond the separator space and the vapor space and constituting walls for the two enclosures of the second pass.

4. In the apparatus of claim 2: one of the enclosures including partitions dividing it into three sections and the other having a partition dividing it into two sections, one connecting means being connected into one of the three sections, the other connecting means being connected into another of the three sections, and the conduit means connecting into all of the sections, to provide that fluid may be caused to flow four times through conduit means in flowing from one connecting means to the other.

5. In the apparatus of claim 4: the three sections of the one enclosure including two quadrant sections and one semi-cylindrical section; and the two sections of the lower enclosure being two semi-cylindrical sections, the latter being at right angles to the semi-cylinder section of the former.

6. In the apparatus of claim 2: the connecting means including an inlet and an outlet both connecting into the same enclosure; partition means in the said enclosure separating the inlet and outlet, whereby fluid will be confined to flowing from the inlet through conduit means to the other enclosure and back to the first enclosure to reach the outlet.

7. In the apparatus of claim 1: the vapor space being between the inner and outer shells, the liquid inlet being disposed to deliver into the upper end of said space at an angle to the inner wall thereof to produce the swirl, and the inner shell terminating above the bottom wall means, and the fluid conduit means of the heat-exchanger passing through the space below the inner shell.

8. In the apparatus of claim 2: the fluid conduit means including tubes opening through the bottom wall into the enclosure below the separator space, and opening through the upper wall of the vapor space into the enclosure above the vapor space.

9. In the apparatus of claim 1: the inner shell having leg means supporting it above the bottom wall means to permit liquid flow from one shell to the other, and laterally-extending means at the top of the inner shell connecting to the outer shell and providing for vapor flow passage from between the shells to above the inner shell.

10. In the apparatus of claim 1: the outer shell extending above the top of the inner shell and constituting walls for the vapor space and for an enclosure above the vapor space; a cover removably secured to the shell to give selective access to the said enclosure, the fluid conduit means of the heat-exchanger opening into said enclosure.

References Cited
UNITED STATES PATENTS

| | | | |
|---|---|---|---|
| 114,666 | 5/1871 | Gordon | 122—118 |
| 117,385 | 7/1871 | Corliss | 122—118 |
| 547,045 | 10/1895 | Sturtevant | 122—118 |
| 3,223,150 | 12/1965 | Tramontini | 122—7 X |
| 3,279,438 | 10/1966 | Baker | 122—7 |

CHARLES J. MYHRE, *Primary Examiner.*